United States Patent [19]
Sidoti

[11] Patent Number: 5,365,834
[45] Date of Patent: Nov. 22, 1994

[54] WIRE GRILL COOKING PAN

[76] Inventor: Dominic A. Sidoti, 292 Pleasantdale Rd., P.O. Box #382, Rutland, Mass. 01543

[21] Appl. No.: 63,671

[22] Filed: May 20, 1993

[51] Int. Cl.$^5$ .............................................. A47J 37/04
[52] U.S. Cl. ....................... 99/450; 99/343; 99/391; 99/351
[58] Field of Search ............... 99/349, 446, 444, 400, 99/425, 449, 450, 391, 341, 343, 342, 351; 126/9 R, 41 R

[56] References Cited

U.S. PATENT DOCUMENTS

| | | | |
|---|---|---|---|
| 1,157,326 | 10/1915 | Ralston | 99/450 |
| 2,681,001 | 6/1954 | Smith | 99/349 |
| 3,478,676 | 11/1969 | Schulze | 99/402 |
| 3,559,565 | 2/1971 | Getz | 99/450 |
| 3,587,447 | 6/1971 | Larkin | 99/400 |
| 3,704,141 | 11/1972 | Grossman | 99/450 |
| 3,853,046 | 12/1974 | Pretorius | 99/449 |
| 4,492,152 | 1/1985 | DeSantis | 99/449 |

FOREIGN PATENT DOCUMENTS 0741965  12/1955  United Kingdom ............... 99/446

*Primary Examiner*—David A. Scherbel
*Assistant Examiner*—Reginald L. Alexander

[57] ABSTRACT

A wire grill cooking pan that may be used to cook more than one type of food at a time on different levels of the pan while retaining the juices that are released during the cooking process. The wire grill cooking pan has a wire grill that is hinged to a pan and secured with a latch. Different food items may be placed below the wire grill for cooking while other food items are placed on the wire grill to be cooked. The pan may then be heated from either the top or the bottom to cook the food while retaining the juices that are released for collection or redistribution to the food.

15 Claims, 5 Drawing Sheets

WIRE GRILL COOKING PAN

BACKGROUND OF THE INVENTION

1. Field of the Invention

The present invention relates to pans and more particularly pertains to wire grill cooking pans which may used to cook more than one type of food at a time on different levels of the pan while retaining the juices that are released during the cooking process.

2. Description of the Prior Art

The use of pans is known in the prior art. More specifically, pans heretofore devised and utilized for the purpose of cooking food are known to consist basically of familiar, expected and obvious structural configurations, notwithstanding the myriad of designs encompassed by the crowded prior art which have been developed for the fulfillment of countless objectives and requirements.

For example, a cooking pan with an elevatable grill can be seen in U.S. Pat. No. 4,220,133 that includes a pan and a grill assembly which is particularly suited for use with a solar cooker.

A universal cooking rack for a barbecue grill can be seen in U.S. Pat. No. 4,942,862 that allows for interchangeable skewing and support racks to be placed upon a barbecue grill for cooking.

The cooking devices previously mentioned are not intended to be used on a conventional stove burner or utilized in a conventional oven. Furthermore, the cooking devices mentioned heretofore do not include a means for retaining the juices that are released while the food is being cooked and collecting them or redistributing them to the food therein.

In this respect, the wire grill cooking pan according to the present invention substantially departs from the conventional concepts and designs of the prior art, and in so doing provides an apparatus primarily developed for the purpose of cooking more than one type of food at a time on different levels of the pan and retaining the juices that are released while the food is being cooked for collection or redistribution to the food therein.

Therefore, it can be appreciated that there exists a continuing need for new wire grill cooking pans which can be used for cooking more than one type of food at a time on different levels of the pan and retaining the juices that are released while the food is being cooked for collection or redistribution to the food therein. In this regard, the present invention substantially fulfills this need.

SUMMARY OF THE INVENTION

In view of the foregoing disadvantages inherent in the known types of pans now present in the prior art, the present invention provides a new wire grill cooking pan construction wherein the same can be utilized to cook more than one type of food at a time on different levels of the pan while retaining the juices that are released while the food is being cooked. As such, the general purpose of the present invention, which will be described subsequently in greater detail, is to provide a new wire grill cooking pan apparatus and method which has many of the advantages of the pans mentioned heretofore and many novel features that result in a wire grill cooking pan that is not anticipated, rendered obvious, suggested, or even implied by any of the prior art, either alone or in any combination thereof.

To attain this, the present invention essentially comprises a substantially rectangular shaped pan with a handle for lifting and a wire grill pivotably attached to the pan so that food to be cooked may be placed under the wire grill and additional food may further be placed on top of the grill. The wire grill can be locked in place and the pan can then be used to cook with any available heat source including ovens and conventional stove burners. Juices that are released from the food during the cooking process are retained in the pan for steaming of the cooking food and for collection.

A second embodiment of the present invention includes a second wire rack that may be used to capture food on the top of the grill so that the wire grill cooking pan may be used in an inverted position without release of the food present thereon.

Another embodiment of the present invention further includes a lid that may be releaseably secured to the pan for retention of heat and steam generated during the cooking process. The lid is of the appropriate height necessary to not interfere with food placed upon the wire grill and the lid further includes a vent means for controlling the release of the steam and heat contained therein.

An even further embodiment of the present invention includes some of the features mentioned in the foregoing paragraphs and further includes a gauge secured to the wire grill cooking pan for identifying the distance present between a first wire rack and a second wire rack. The gauge may then be utilized to ascertain the change in thickness that occurs during the cooking process.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wire grill cooking pan apparatus and method which has many of the advantages of the pans mentioned heretofore and many novel features that result in a wire grill cooking pan that is not anticipated, rendered obvious, suggested, or even implied by any of the prior art, either alone or in any combination thereof.

It is another object of the present invention to provide a new wire grill cooking pan which may be easily and efficiently manufactured and marketed.

It is a further object of the present invention to provide a new wire grill cooking pan which is of a durable and reliable construction.

An even further object of the present invention is to provide a new wire grill cooking pan which is susceptible of a low cost of manufacture with regard to both materials and labor, and which accordingly is then susceptible of low prices of sale to the consuming public, thereby making such wire grill cooking pans economically available to the buying public.

Still yet another object of the present invention is to provide a new wire grill cooking pan which provides in the apparatuses and methods of the prior art some of the advantages thereof, while simultaneously overcoming some of the disadvantages normally associated therewith.

Still another object of the present invention is to provide a new wire grill cooking pan that may be used to cook more than one type of food at a time on different levels of the pan.

Yet another object of the present invention is to provide a new wire grill cooking pan that can be utilized for retaining the juices that are released while the food is being cooked for collection or redistribution to the food therein.

Even still another object of the present invention is to provide a new wire grill cooking pan that includes a gauge secured to the wire grill cooking pan for identifying the distance present between a first wire rack and a second wire rack so that a user may ascertain the change in thickness that occurs during the cooking process.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
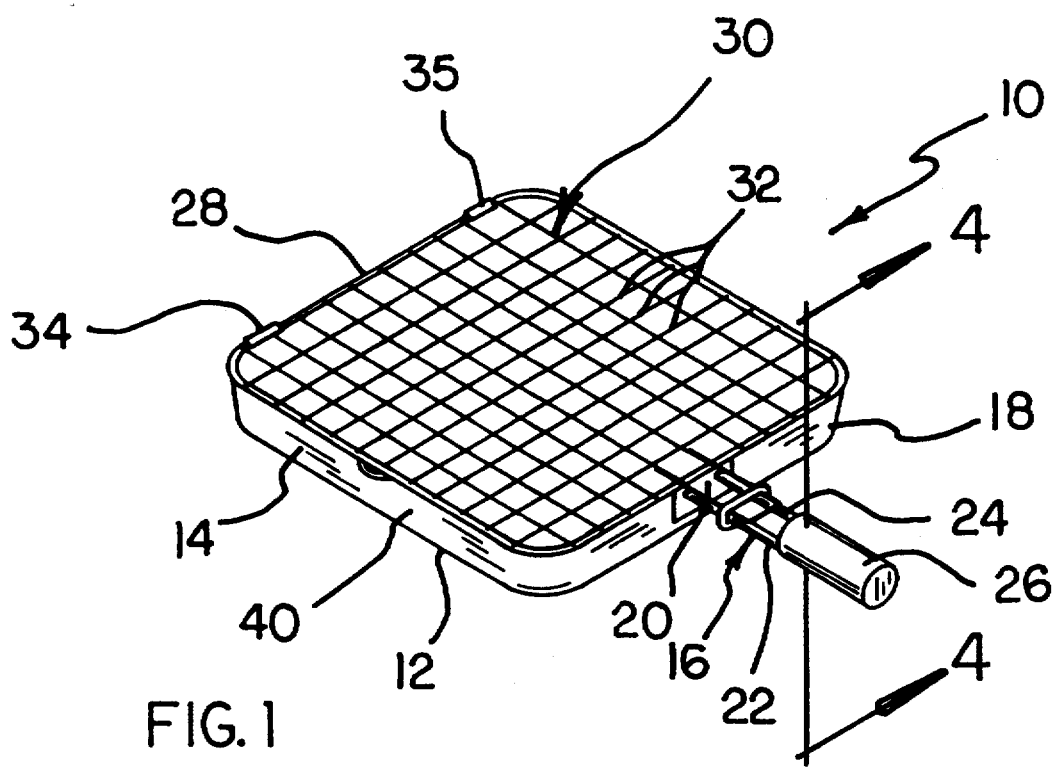
FIG. 1 is a perspective view of a wire grill cooking pan comprising the present invention.

With reference now to the drawings, and in particular to FIGS. 1-4 thereof, a new wire grill cooking pan embodying the principles and concepts of the present invention and generally designated by the reference numeral 10 will be described.

More specifically, it will be noted that the wire grill cooking pan 10 of the present invention comprises a substantially square bottom plate 12 and a substantially square sidewall 14 that is formed in a such a manner as to define a circumferential boundary when joined orthogonally to the perimeter of the bottom plate. The sidewall 14 has substantially round defining corners and further has a handle assembly 16 attached to a first side 18 of the sidewall to facilitate lifting and manipulation of the invention 10 by a user. The handle assembly 16 comprises a plate 20 attached to the sidewall 14 with two supporting rods 22, 24 attached to the plate. The supporting rods 22, 24 are further attached to a handle 26 that is made of a substantially heat resistant material.

Figure 2:
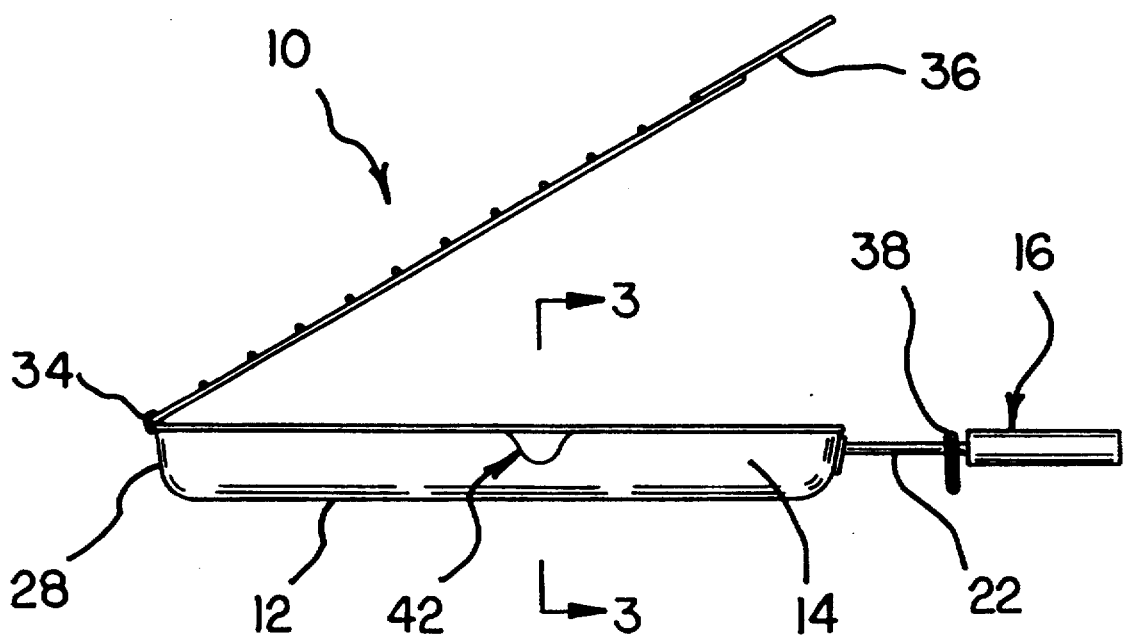
FIG. 2 is a side elevation view of the present invention.
Figure 3:
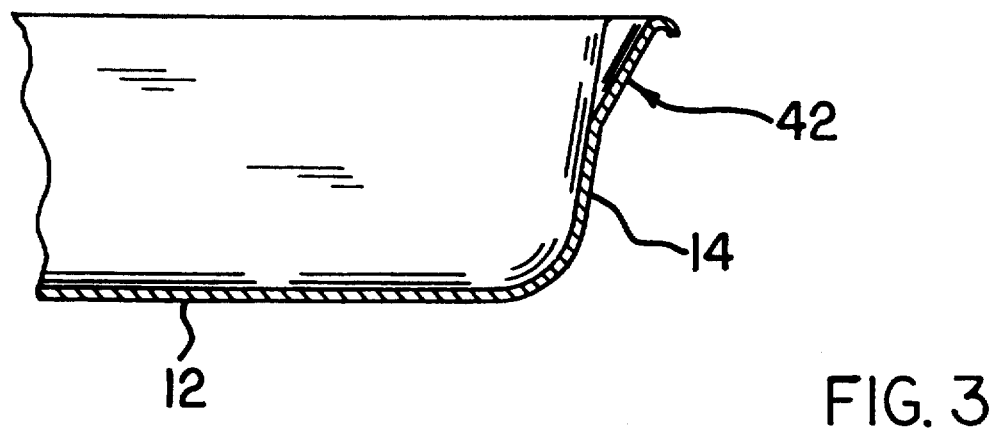
FIG. 3 is a partial cross sectional view taken along line 3—3 of FIG. 2.
Figure 4:
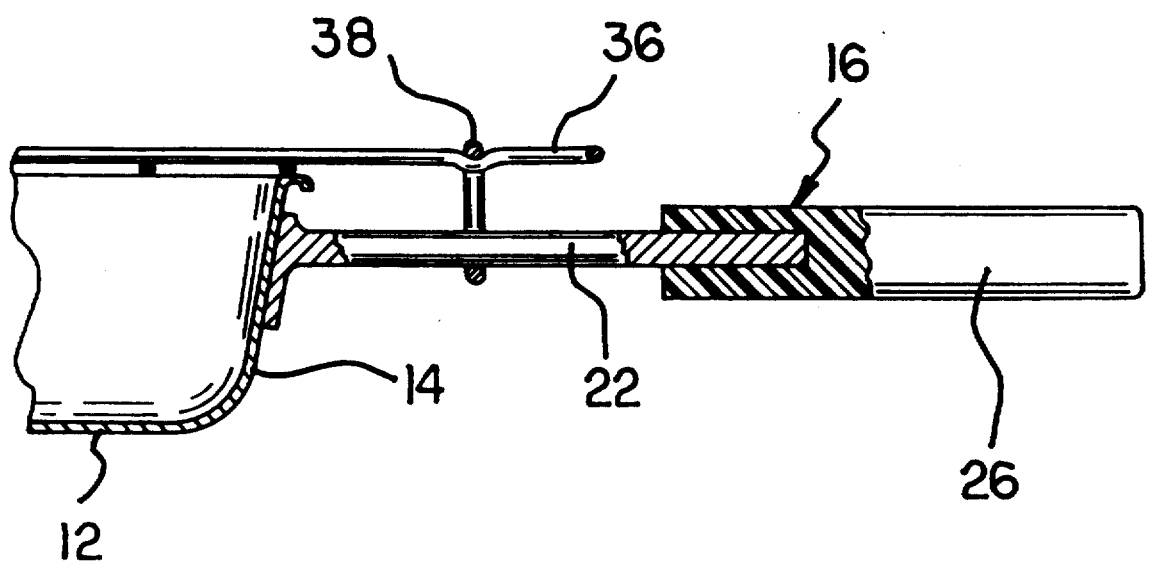
FIG. 4 is a partial cross sectional view of the present invention taken along line 4—4 of FIG. 1.

Pivotably secured to a second side 28 of the invention 10 is a wire grill 30 that is comprised of a plurality of cross directed rods 32. The wire grill 30 is attached to the second side 28 by a pair of hinges 34, 35 so as to allow the wire grill to pivot away from the bottom plate 12 and sidewall 14o The wire grill 30 is further comprised of a catch 36 that may be engaged to a keeper 38 which is slideably secured to the handle assembly 16 as best shown in FIGS. 2 and 4. Integral with a third side 40 of the sidewall 14 is a pouring spout 42 that allows for any liquid captured within the invention to be released by pouring while allowing for manipulation and direction of the liquid stream created thereby in a well understood manner.

Figure 5:
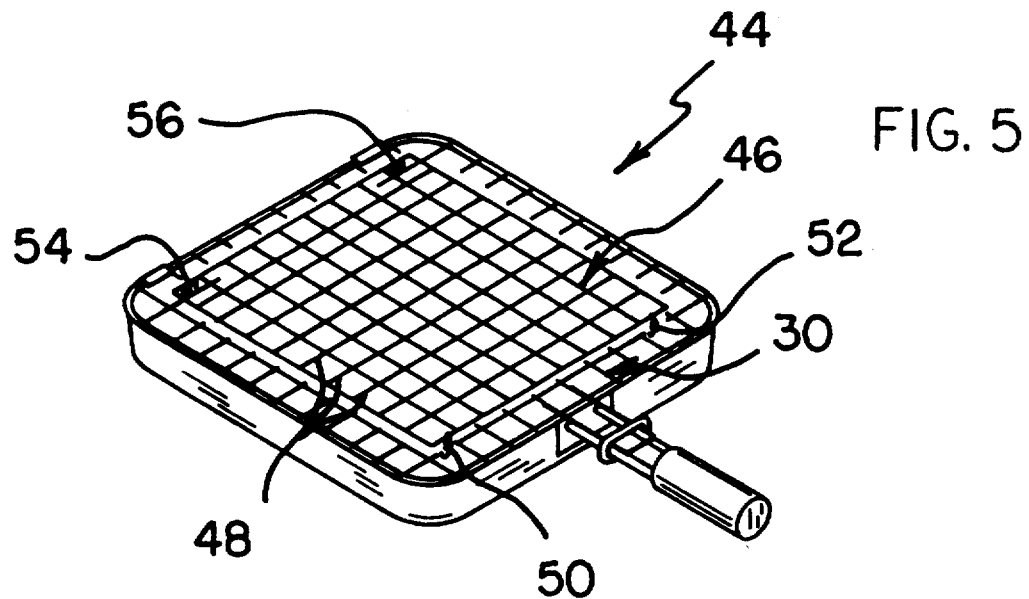
FIG. 5 is a perspective view of a second embodiment of the invention.
Figure 6:
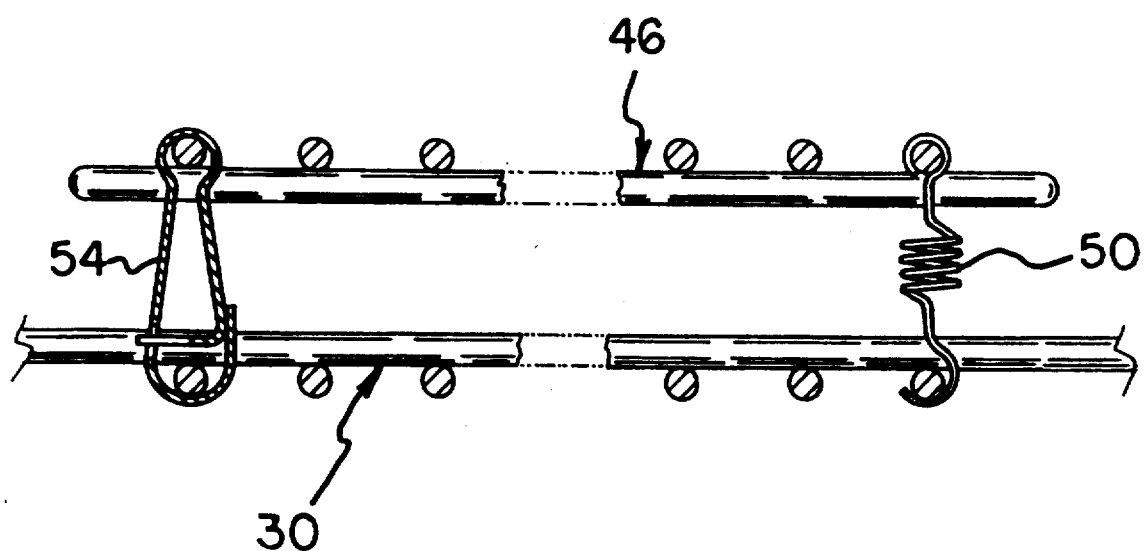
FIG. 6 is a side elevation view of a portion of the second embodiment.

With reference to FIGS. 5 and 6, a second embodiment of the present invention as designated by the reference numeral 44 comprises all of the foregoing features listed above in the previous embodiment and further includes a wire food holder 46 that is comprised of a plurality of rods 48. The wire food holder 46 is attached to the wire grill 30 by a pair of springs 50,52 and a pair of latches 54, 56. When the latches 54, 56 are released from the wire grill 30, the wire food holder 46 may pivot on the springs 50, 52 away from the wire grill so that food may be placed between the wire food holder and the wire grill. The wire food holder 46 may then be pivoted towards the wire grill 30 and latched in place by the latches 54, 56 in a well understood manner. The springs 50, 52 are arranged to allow for a slight compressive force to be imparted to the food captured between the wire grill 30 and the wire food holder 46 thereby precluding slippage of the food during manipulation or inversion of the device 44.

Figure 7:
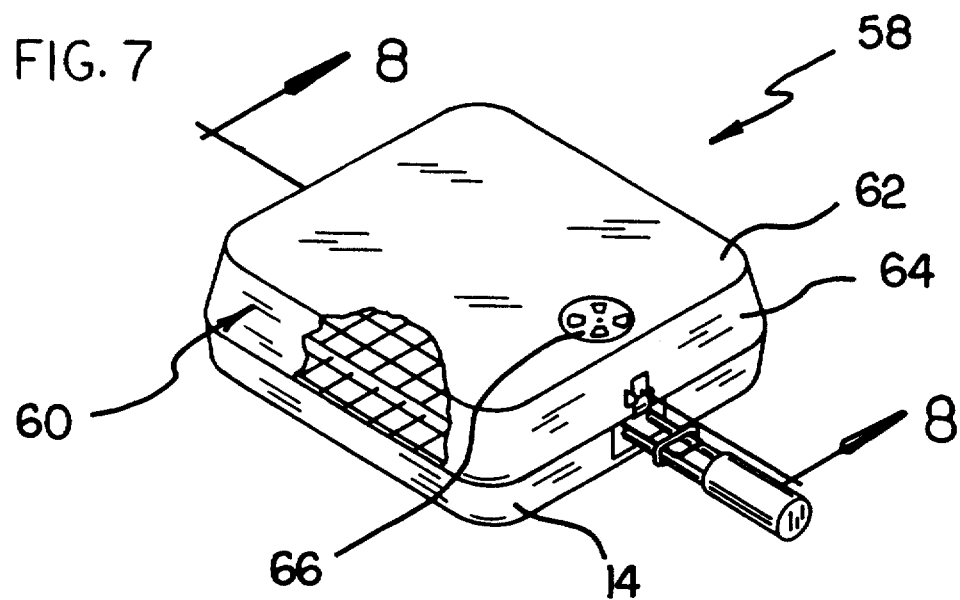
FIG. 7 is a partial perspective view of a further embodiment of the present invention.
Figure 8:
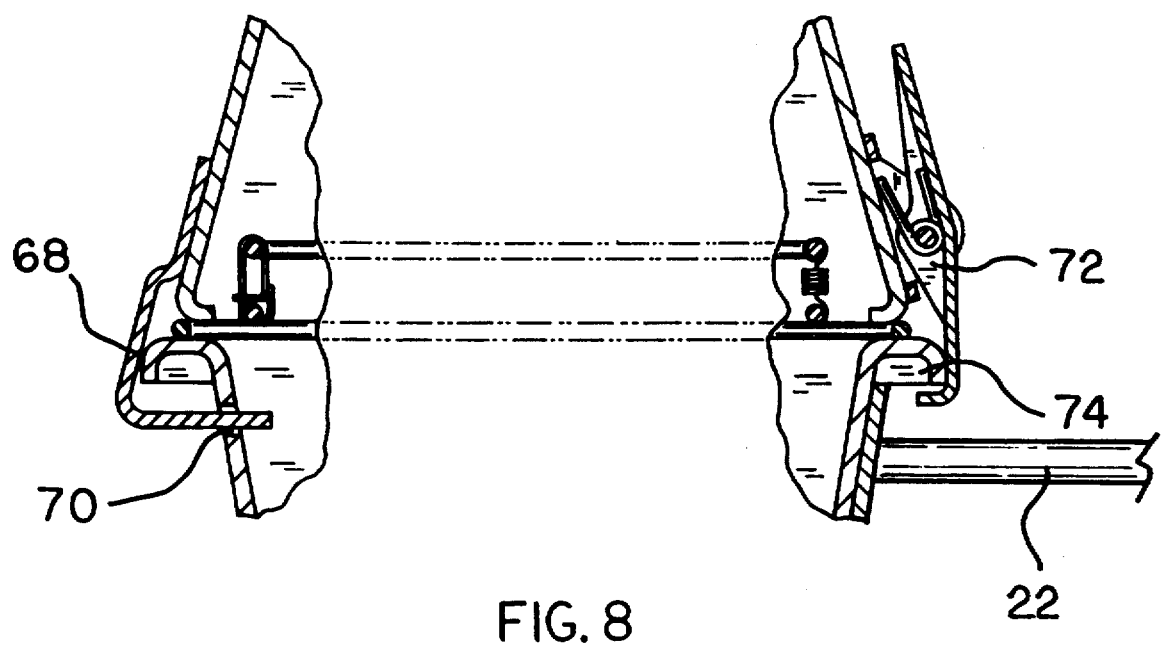
FIG. 8 is a partial cross sectional view taken along line 8—8 of FIG. 7.

Another embodiment of the present invention as designated by the reference numeral 58 and shown in FIGS. 7 and 8 comprises all of the foregoing features listed above in the previous embodiment and further comprises a lid assembly 60 that may be attached to the invention 58 to retain the steam and heat present therein. The lid assembly 60 includes a substantially flat top plate 62 and a substantially square cover sidewall 64 that is formed in a such a manner as to define a circumferential boundary when joined orthogonally to the perimeter of the top plate. The lid assembly further includes a vent 66 that may be opened to allow for regulated escape of the steam and heat present therein. To facilitate securement of the lid assembly 60 to the sidewall 14 of the invention 58, the lid assembly is provided with a hook 68 that may be engaged to an aperture 70 present in the sidewall 64 and a spring biased latch 72 that may be engaged to the sidewall by contact with a flange 74 present along the top perimeter of the sidewall.

Figure 9:
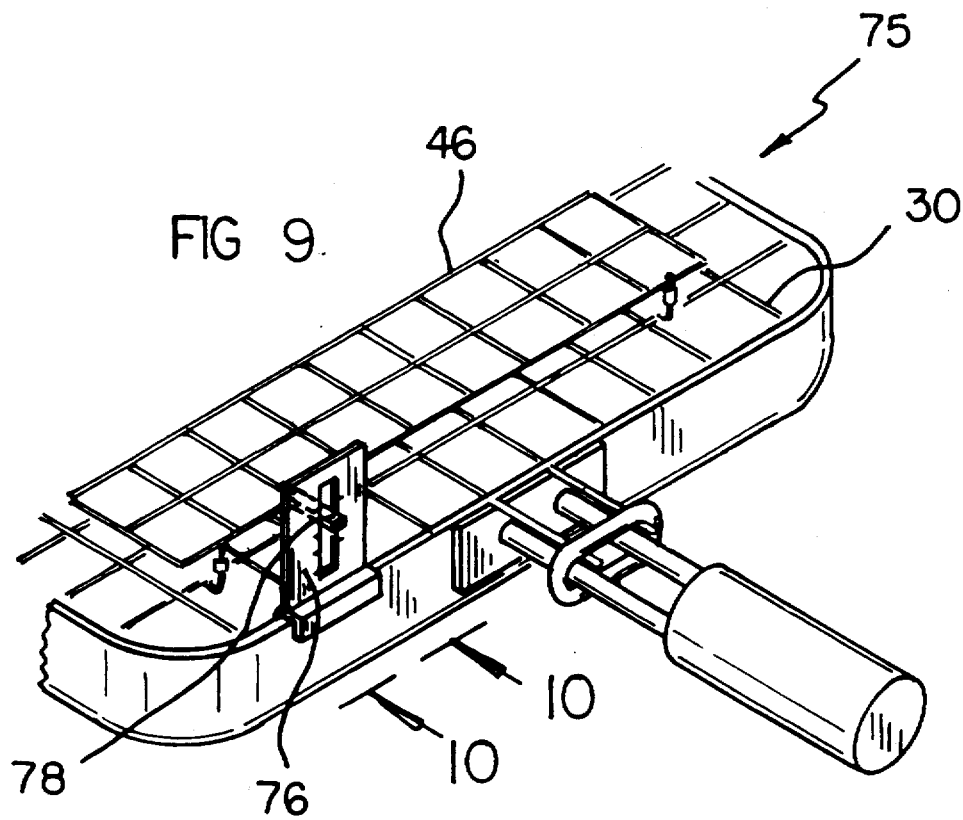
FIG. 9 is a partial perspective view of an even further embodiment of the invention.
Figure 10:
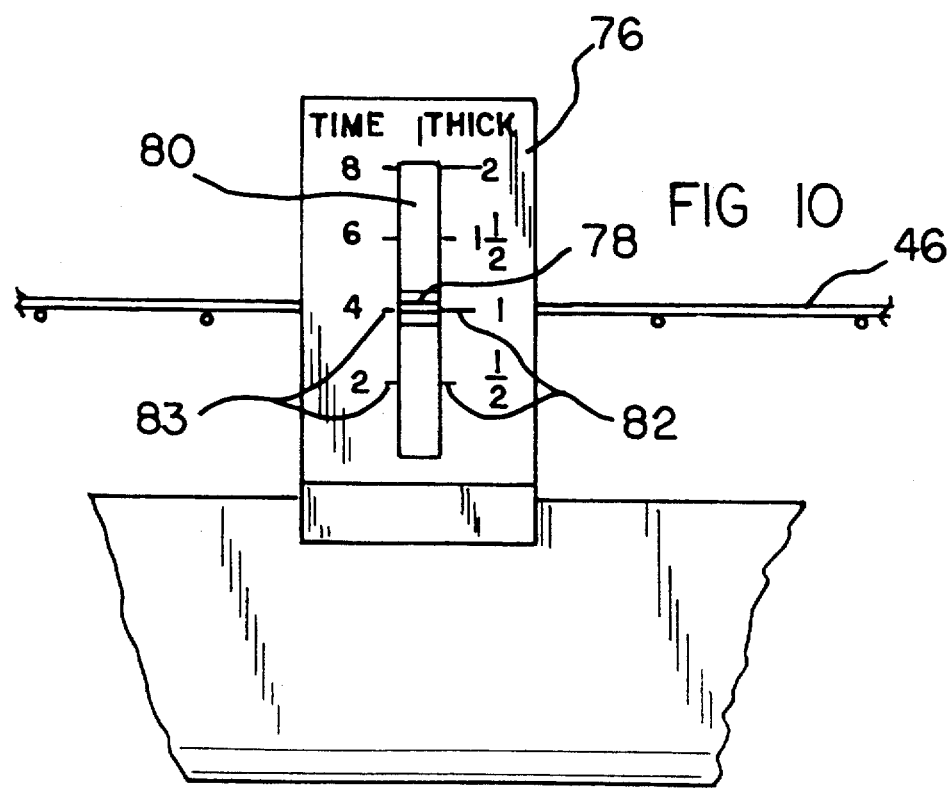
FIG. 10 is an enlarged partial view as viewed along line 10—10 of FIG. 9.

An even further embodiment of the present invention, as designated by the reference numeral 75 and as best shown in FIGS. 9 and 10, includes a gauge 76 that is fastened to the sidewall 14 of the invention. A pointer 78 is fixedly secured to the wire food holder 46. The pointer 78 extends through an enlongated aperture 80 in the gauge 76. The gauge 76 further includes graduation markings 82 to indicate the distance present between the wire grill 30 and the wire food holder 46 to display the change in thickness that occurred during the cooking process to the food captured between the wire grill and the wire food holder. The gauge 76 further includes a second graduated scale 83 which defines time increments proportionally aligned with the thickness scale 82. The second scale 83 allows a user to directly gauge a suggested cooking time relative to the displayed thickness of the food on the scale 82.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new wire grill cooking pan comprising:
   a container means whereby juices may be collected therein;
   a grill means attached to said container means for facilitating elevated support of a food item above said container means; and
   a handle fixedly secured to said container means;
   further comprising a wire food holder pivotally connected to said grill means whereby food may be captured between said grill means and said wire holder;
   and further comprising a gauge means for determining a distance between said wire holder food holder and said grill means.

2. The new wire grill cooking pan of claim 1 wherein said container means comprises a substantially flat plate and further comprises a sidewall substantially orthogonally secured to said plate so as to define a circumferential boundary along a perimeter of said plate.

3. The new wire grill cooking pan of claim 1 wherein said grill means comprises a plurality of spaced rods fixedly secured to a further plurality of spaced rods so as to define a grid.

4. The new wire grill cooking pan of claim 1 wherein said grill means is pivotably secured to said container means by at least one hinge.

5. The new wire grill cooking pan of claim 4 wherein said grill means may be releaseably secured to at least one of said handle and said container means by a latch means.

6. The new wire grill cooking pan of claim 5 wherein said latch means comprises a catch fixedly secured to said grill means and a keeper slideably connected to said handle whereby said catch may be selectively engaged to said keeper.

7. The new wire grill cooking pan of claim 1 and further comprising a latch attached to said wire food holder to facilitate engagement of said wire food holder to said grill means.

8. The new wire grill cooking pan of claim 1 further comprising a covering means releaseably attachable to said container means for covering said container means.

9. The new wire grill cooking pan of claim 8 wherein said covering means comprises a substantially flat top plate and further comprises a sidewall orthogonally secured to said top plate in a manner so as to define a circumferential boundary along the perimeter of said top plate.

10. The new wire grill cooking pan of claim 8 and further comprising a latch means for releaseably securing said covering means to said container means.

11. A new wire grill cooking pan comprising:
    a container comprising a substantially flat plate and further comprising a sidewall substantially orthogonally secured to said plate so as to define a circumferential boundary along a perimeter of said plate whereby juices may be collected therein;
    a wire grill pivotally secured to said container by at least one hinge for facilitating elevated support of a food item above said container;
    a wire food holder pivotally connected to said wire grill whereby said food item may be captured between said wire grill and said wire food holder; and
    a handle fixedly secured to said container mean;
    further comprising a gauge means for determining a distance between said wire food holder and said wire grill.

12. The new wire grill cooking pan of claim 11 wherein said wire grill may be releaseably secured to at least one of said handle and said container by a latch means.

13. The new wire grill cooking pan of claim 12 wherein said latch means comprises a catch fixedly secured to said wire grill and a keeper slideably connected to said handle whereby said catch may be engaged to said keeper.

14. The new wire grill cooking pan of claim 11 and further comprising a covering means releaseably attachable to said container for covering said container.

15. The new wire grill cooking pan of claim 14 wherein said covering means comprises a substantially flat top plate and further comprises a sidewall substantially orthogonally secured to said top plate so as to define a circumferential boundary along a perimeter of said top plate.

* * * * *